United States Patent
Zhang (10) Patent No.: US 7,457,246 B2
(45) Date of Patent: Nov. 25, 2008

(54) ADAPTIVE THREADS ASSIGNMENT FOR RECEIVING PACKETS

(75) Inventor: Richard Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 796 days.

(21) Appl. No.: 11/021,142

(22) Filed: Dec. 22, 2004

(65) Prior Publication Data

US 2006/0133369 A1 Jun. 22, 2006

(51) Int. Cl.
*G06F 11/00* (2006.01)

(52) U.S. Cl. ............... 370/230; 370/231; 709/226

(58) Field of Classification Search ......... 370/229–235; 709/201, 226
See application file for complete search history.

(56) References Cited

U.S. PATENT DOCUMENTS

| | | | |
|---|---|---|---|
| 6,661,794 B1* | 12/2003 | Wolrich et al. ............... | 370/394 |
| 6,947,425 B1* | 9/2005 | Hooper et al. ............... | 370/394 |
| 6,952,824 B1* | 10/2005 | Hooper et al. ............... | 718/100 |
| 6,976,095 B1* | 12/2005 | Wolrich et al. ............... | 709/250 |
| 2004/0133428 A1* | 7/2004 | Brittan et al. ............... | 704/276 |

* cited by examiner

*Primary Examiner*—Ricky Ngo
*Assistant Examiner*—Dady Chery
(74) *Attorney, Agent, or Firm*—Daly, Crowley, Mofford & Durkee, LLP; Anthony T. Moosey (57) ABSTRACT

Systems and methods for assigning threads in a processor are disclosed. The method generally includes assigning one or more static threads to each port of a plurality of ports and processing incoming packets with the static threads. The port numbers of incoming packets processed by the static threads are stored and the number of packets processed by the static threads for each port is counted. An average thread workload for each port is calculated by dividing the number of packets processed by the number of static threads assigned to the port. A dynamic thread is assigned to the highest average thread workload port.

20 Claims, 7 Drawing Sheets

ADAPTIVE THREADS ASSIGNMENT FOR RECEIVING PACKETS

BACKGROUND OF THE INVENTION

Network processors use multiple units of execution that run independently. These units of execution are commonly referred to as threads or contexts. Receiving threads are utilized to process incoming network packets. The number of available receiving threads varies based on the particular network processor.

Conventionally, receiving threads are bound to a particular port on which packets are received and process only packets received from that port. The bounding of a particular receiving thread is not altered throughout processing period.

However, the flow of network packets across the ports may not be distributed evenly and may vary from time to time. As a result, there may be a shortage of receive threads available to process packets received from a heavy flow port while there may be idle receive threads that are bound to ports with little or no packet flow. In such a scenario, the network processors are under-utilized such that the packet processing speed is adversely affected. Thus there is a need for more efficient and effective systems and methods for assignment of threads for receiving and processing network packets in order to increase overall packet processing speed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Methods for assigning threads in a processor are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
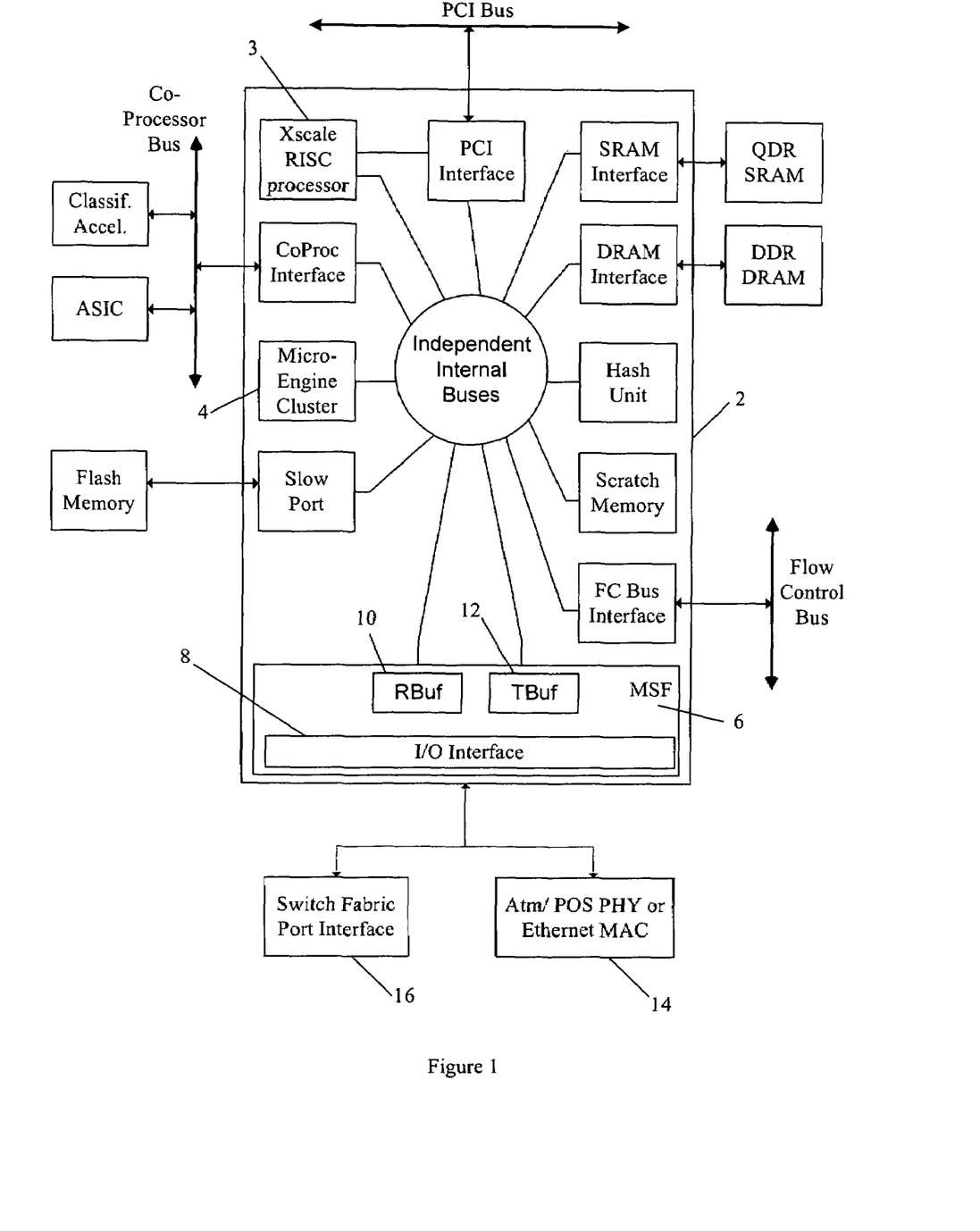
FIG. 1 illustrates a simplified block diagram of a network processor.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), Generally, this description describes a method and apparatus for adaptively assigning threads for processing incoming network packets. FIG. 1 illustrates a simplified block diagram of a network processor 2. Network processor 2 generally includes microengines (MEs) 4 and media and switch fabric (MSF) 6. The MSF 6 may include an input/output (I/O) interface 8, a receive buffer (RBuf) 10, and a transmit buffer (TBuf) 12. The I/O interface 8 may be, for example, a Universal Test and Operations Interface for Asynchronous Transfer Mode (UTOPIA) Interface, System Packet Interface (SPI), or Packet Over SONET (POS) Interface, or Common Switch Interface (CSIX). Merely as an example, the network processor 2 may be an Intel® Internet eXchange network Processor (IXP). Additional functional blocks shown in FIG. 1 are known to those of ordinary skill in the art and will not be described in detail herein for purposes of clarity.

The network processor 2 generally includes a processor 3 such as an Intel Xscale® Reduced Instruction Set Computer (RISC) processor that assists in loading microcode control for other resources of the network processor 2 and performs other general purpose computer type functions such as handling protocols, exceptions, and extra support for packet processing. The processor 3 may use an operating system such as a real-time operating system. However, any supported operating system may be used. The microengines 4 include a control store for storing microprograms loadable by the processor 3. The microengines 4 may further include control logic having an instruction decoder and program counter units.

The I/O interface 8 is the primary interface for transferring network packets between the network processor 2 and media access controls (MACs), framers, and fabric interface chips 14, 16. The I/O interface 8 connects network processor 2 to a physical layer device (PHY) such as Asynchronous Transfer Mode/Packet Over SONET (ATM/POS) PHY or Ethernet MAC 14 and/or to a switch fabric via a switch fabric port interface 16. The I/O interface 8 includes separate receive and transmit interfaces that are unidirectional and independent of each other. Each of the receive and transmit interfaces can be separately configured as either UTOPIA Level 1/2/3 or POS-PHY 2/3 for a PHY device interface, or Common Switch Interface-Layer 1 (CSIX-L1) protocol for a switch fabric interface.

The MSF 6 is located between the MACs and framers 14 and microengines 4. Since the microengines 4 are primarily responsible for the processing of packets, the MSF 6 buffers the received network packets and the packets to be transmitted in the RBuf 10 and TBuf 12, respectively.

The microengines 4 may be software programmable processors that perform the bulk of network packet data processing. The network processor 2 may have differing numbers of microengines. For example, the network processor 2 may have 8 or 16 microengines 4. Each microengine 4 is generally multithreaded with hardware support for multiple threads and context switching. For example, each microengine 4 can manage up to eight tasks or threads simultaneously. Each microengine 4 has only one execution unit and while it is processing one task, the other seven tasks are asleep waiting for memory or I/O access or other function to complete.

The microengines 4 have access to all shared resources, including static random access memory (SRAM), dynamic RAM (DRAM), and MSF 6. Each microengine 4 has several types of data path registers, including general purpose registers, transfer registers, next neighbor registers, and local memory. Functionality of the microengine threads is determined by the microcode loaded for a particular user's application into each microengine's control store. The microcode may be referred to by the assignee as a microblock group to denote a set of microblocks that run on a single microengine. The microblocks may include a source microblock, transform microblock, and sink microblock. The source microblock serves as the initial point by receiving packets that originate outside the microengine.

Data packets arrive on a POS, UTOPIA, or CSIX hardware interface. The network processor may receive data packets from an Ethernet Network, such as an Intel IXF 1104® Quad Gigabit Ethernet MAC utilizing an SPI or UTOPIA interface, for example. The MSF 6 receive and transmit ports are unidirectional and independent from each other. Each port may have 32 data signals, two clocks, asset of control signals, and a set of parity signals. In UTOPIA and POS-PHY modes, each port can function as a single 32-bit interface or be subdivided into a combination of 8-bit channels or 16-bit channels. The MSF 6 generally operates in a channelized mode. When running in a channelized mode, each channel operates independently and each channel is a point-to-point connection to a single PHY. This connection is also known and referred to herein as a single-PHY (SPHY) mode.

Figure 2:
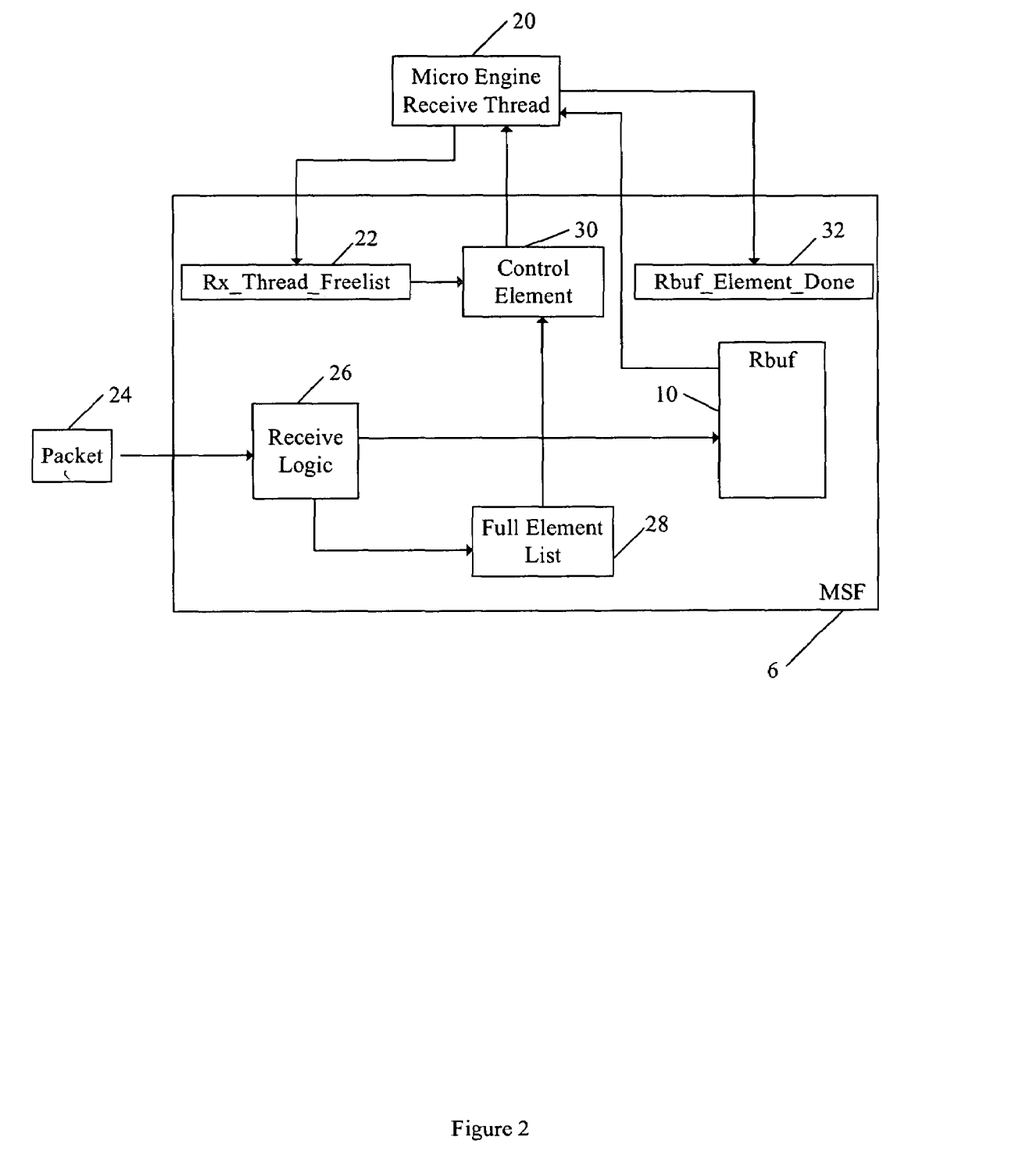
FIG. 2 illustrates the operation of network processor and a Media and Switch Fabric in receive processing of network data packets utilizing threads from a Rx_Thread_Freelist.

Referring to FIG. 2, the operation of network processor 2 and MSF 6 in receive processing of network data packets utilizing threads from a Rx_Thread_Freelist is illustrated. Each receive port of network processor 2 has a Rx_Thread_Freelist listing available threads to process data packets. For example, the network processor 2 utilizes four Rx_Thread_Freelists corresponding to four receive ports. Each packet stored in DRAM includes a packet descriptor with information on the port number it was received on, the packet length, where the packet is stored in DRAM, and other related information.

After a microengine (ME) receive thread 20 finishes processing a packet, the ME receive thread 20 communicates to the MSF 6 that it is available to process new incoming packets by registering in an appropriate Rx_Thread_Freelist. Determination of the appropriate Rx_Thread_Freelist is discussed in further detail below. Referring to FIG. 2 for example, the ME receive thread 20 registers with an Rx_Thread_Freelist 22. The MSF 6 determines which thread to assign a packet based on a software-controlled thread free list. The Rx_Thread_Freelist contains the thread IDs that are available to process packets. Each Rx_Thread_Freelist has a free list timeout programmed with the number of MSF bus cycles that must elapse in the absence of bus activity before the MSF auto-pushes a null packet status word to the next thread on the Rx_Thread_Freelist.

Figure 3:
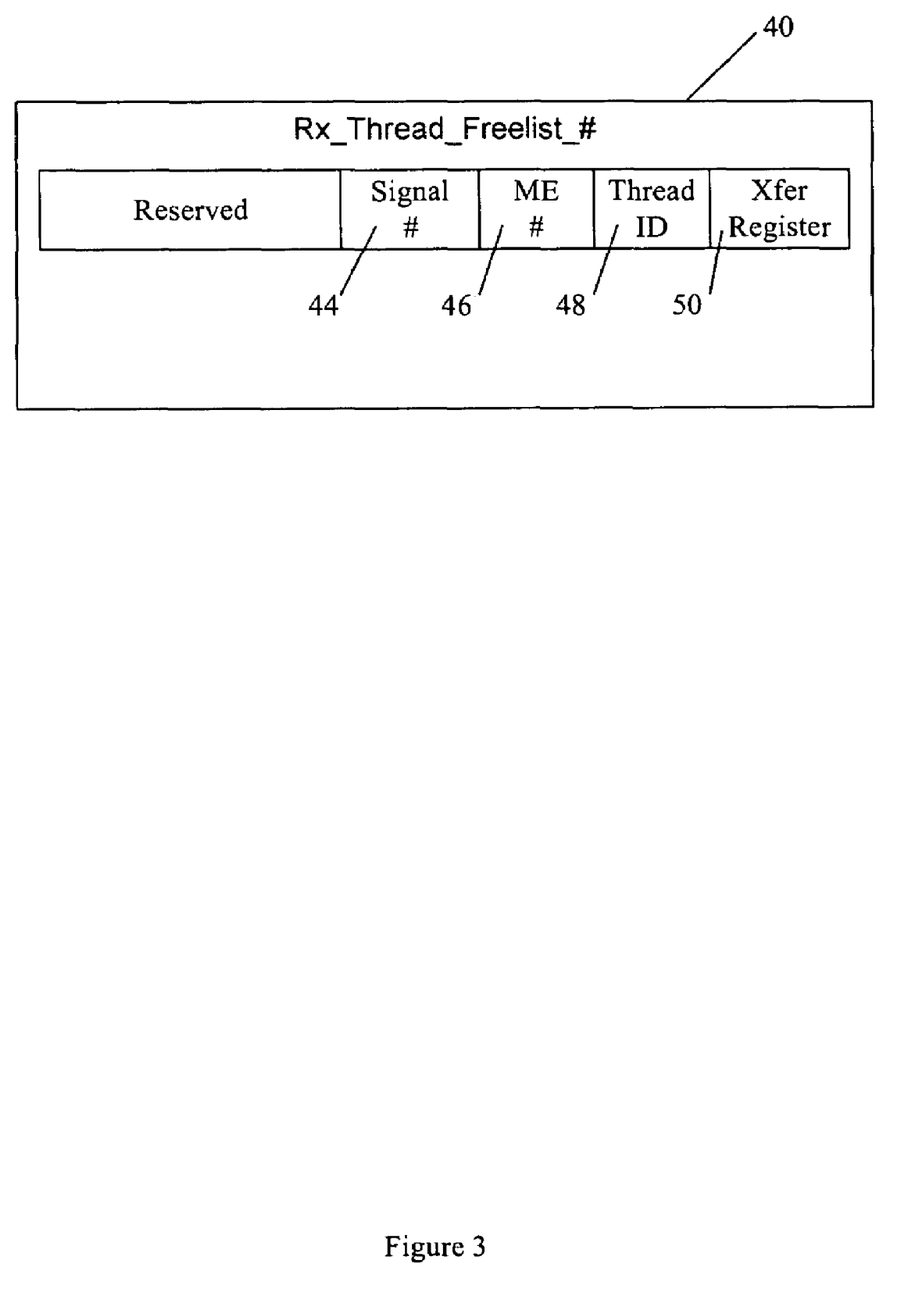
FIG. 3 illustrates a format of a Rx_Thread_Freelist entry.

Referring to FIG. 3, a format of a Rx_Thread_Freelist 40 entry is illustrated. The entry includes fields for a signal number 44, an ME number 46, a thread ID 48, and a transfer register 50. Entry fields may be defined in software by an originating thread which fills the Rx_Thread_Freelist. When a receive thread is finished processing a packet, the receive thread updates the Rx_Thread_Freelist register with its thread ID 48 and other fields. The entry fields assist MSF 6 to correctly assign incoming packets to the appropriate receive thread. In particular, the ME number 46 and thread ID 48 indicate which thread of a particular microengine should process the packet, while the transfer register 50 indicates the transfer register of a particular microengine to which the MSF 6 should deposit a packet's receive status control word. The signal number 44 indicates to the MSF 6 which generalized thread signal to use to signal the thread once the receive status word is pushed to transfer register 50. The receive status word is formatted according to the specific interface on which packet 24 is received. The receive status word varies, and may include a port field for indicating the port on which the packet was received. The receiving thread uses the status word to determine what to do with the packet in an RBuf element.

Referring again to FIGS. 1 and 2, an incoming packet 24 is received by a receive logic 26 when it arrives at the MSF 6. The receive logic 26 allocates an RBuf element in RBuf 10. The receive logic 26 pulls the packet 24 from the ATM/POS PHY or Ethernet MAC 14 and deposits the packet in the allocated RBuf element. Upon completion of buffering of the packet 24, the receive logic 26 updates a full element list 28 with the newly full element number. Control element 30 is also updated with the element number.

The control element 30 retrieves a thread ID from the Rx_Thread_Freelist 22. The control element 30 forms the receive status word and auto-pushes the word into a transfer register of the microengine thread that is indicated in Rx_Thread_Freelist 22. The signal type, indicated in the Rx_Thread_Freelist 22 entry, signals the ME receive thread 20. The thread processes the new packet 24. Upon completion of packet processing, the ME receive thread 20 returns the element to a RBuf_Element_Done list 32.

The total available threads for each microengine can be generally divided into two groups: static threads that are bound to a port (also referred to herein as "pre-assigned threads") and dynamic threads that are not bound to a particular port. Each static thread is bound to one specific port and assignment of the specific port is not changed during the whole working period. Each static thread is assigned to a single Rx_Thread_Freelist and processes packets received over the corresponding port. The activity of each static thread is used to estimate the thread workload of each port. After processing a packet, each dynamic thread is dynamically assigned to a Rx_Thread_Freelist based on the thread workload of each port. Dynamic threads therefore redecide their serving port every process cycle according to instant thread workload to balance workload among all receiving threads.

The thread workload of each port can be estimated using a data structure containing the port numbers on which a predetermined number of previously processed packets were received. For each port, a counter is used to count the number of processed packets received for the corresponding port and stored in the data structure. Thus a counter counts the frequency of appearance of a port number in the data structure. Each time a new packet 24 is received at the MSF 6, the packet 24 is processed and the port on which the packet was received is stored in the data structure and the corresponding counter incremented. When the data structure reaches capacity, the data structure is updated each time a new packet 24 is processed by discarding the port number for the oldest packet processed and storing the port number for the newest packet processed. The counter corresponding to the port number for the oldest packet processed is decremented by one and the counter corresponding to the port number for the newest packet processed is incremented by one. In this manner, the data structure and counters are kept current for the most recent predetermined number of previously processed packets. Additional and/or alternative methods for updating the data structure and counters may be similarly employed.

Figure 4:
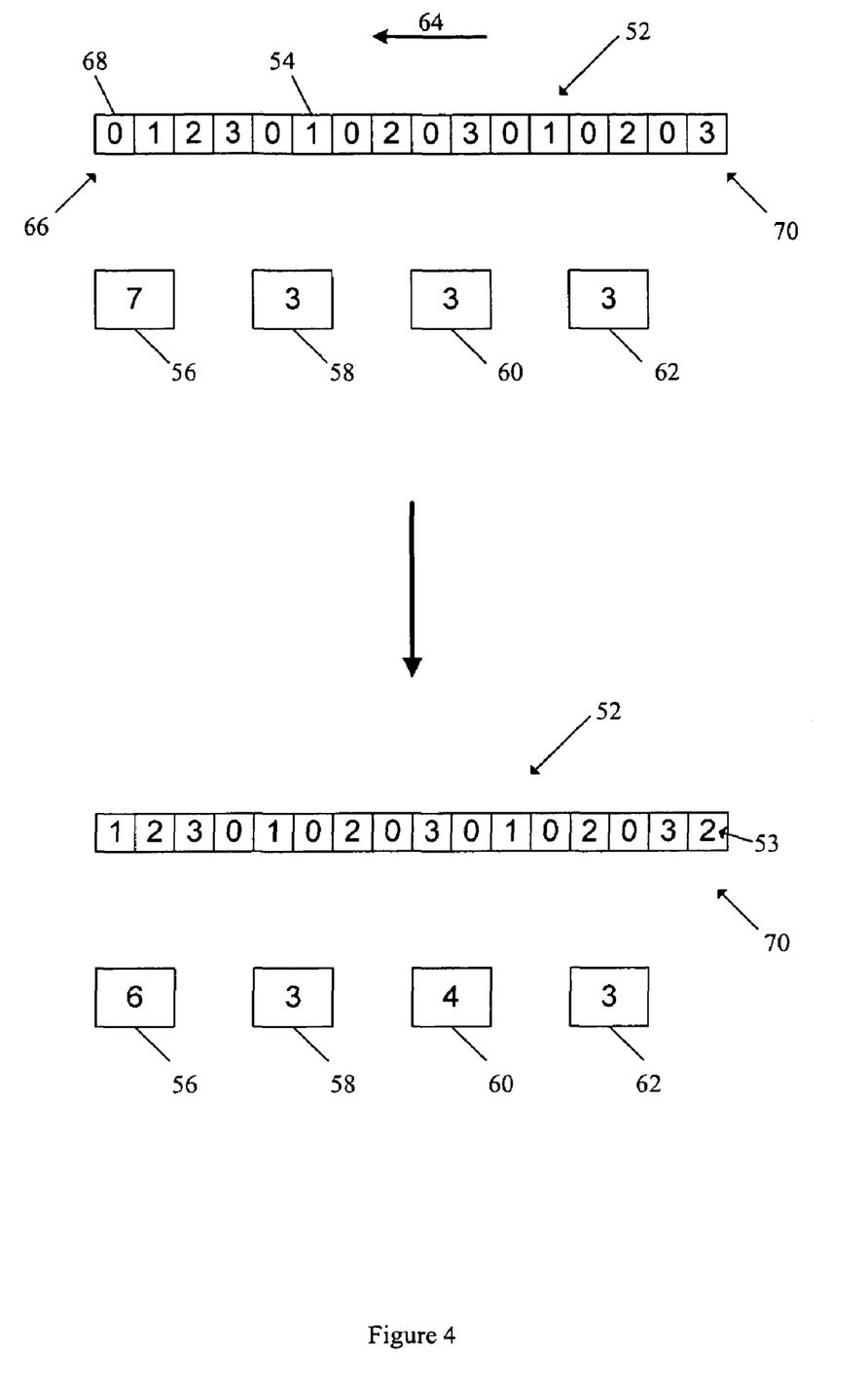
FIG. 4 illustrates a data structure for storing port numbers of processed packets.

Referring to FIG. 4, an example of the data structure 52 and its operation is illustrated. The data structure shown is a first in first out (FIFO) data structure 52. Data structure 52 contains sixteen elements 54, each storing the port number on which a processed packet was received. For a network processor utilizing four receive ports, four counters 56, 58, 60, and 62 are used to count the number of each port numbers 0, 1, 2, and 3, respectively, in the data structure 52. As shown in FIG. 4, where the port number 0 is stored in the data structure 52 seven times, the counter 56 corresponding to port 0 has a value of seven. Similarly, where ports 1, 2, and 3 are each stored in data structure 52 three times, the corresponding port counters 58, 60, and 62 each has a value of 3. Various other suitable data structures may be utilized to store port numbers of processed packets. In addition, various other suitable size of the data structure 52 and associated number of port numbers for processed packets may be utilized.

In operation, prior to receiving a new packet on port number 2, the status of the data structure 52 and the four counters 56, 58, 60, and 62 are as shown in the upper portion of FIG. 4. When a new packet is received on port number 2, the contents of the data structure 52 and counters 56, 58, 60, 62 are updated accordingly as shown in the lower portion of FIG. 4. In particular, the oldest element stored in the data structure 52 is discarded and contents of the storage elements in the data structure 52 are shifted by one element in a direction 64 toward a head end 66 of the data structure 52. In the example shown in FIG. 4, the oldest stored port number 68 at the head end of the data structure 52 is port number 0. The port number 2 53 corresponding to the new packet received is inserted at a tail end 70 of the data structure 52. Counter 56 corresponding to port number 0 is decremented by one and counter 60 corresponding to port number 2 is incremented by one to reflect the updated contents of data structure 52 as shown in the lower portion of FIG. 4.

The number of times pre-assigned threads are called can be used to estimate the thread workload of each port. The Rx_Thread_Freelist operates as a FIFO, with each pre-assigned thread in the Rx_Thread_Freelist having the same probability to be called. A flow throughput corresponding to the total number of times that all pre-assigned threads in a Rx_Thread_Freelist are called within an interval represents the current workload of the pre-assigned threads serving the port corresponding to the Rx_Thread_Freelist.

The flow throughput of a port as a function of time s(t) can be represented by the equation:

$$s(t) = \sum_{i=1}^{K} n_i(t+T) - \sum_{i=1}^{K} n_i(t)$$

where t is time, T is a given time interval, K is a number of pre-assigned threads serving the port, and n(t) is the number of times that one pre-assigned thread has been called till time t.

From the flow throughput s(t), an estimated thread workload of the port p(t) can be determined as:

$p(t)=s(t)/K$

Each Rx_Thread_Freelist is assigned at least one pre-assigned thread. As a result, there is at least one thread available to process an incoming packet on a slow port. The estimated thread workload of each port is determined using the data structure 52 and counters 56, 58, 60, and 62. Values stored in counters 56, 58, 60, and 62 represent the flow throughput s for each port. The value of each counter 56, 58, 60, and 62 is divided by K for each respective port to determine the estimated thread workload p for each port. The resulting average thread workload of each port is compared to determine the port with the highest average thread workload. An available dynamic thread is assigned to the Rx_Thread_Freelist of the port with the highest average thread workload in order to balance the workload among all receiving threads. The number of pre-assigned threads K assigned to each port may be selected to be a power of two for efficiency so that the division operation can be performed with a bit shift right operation on a bit string counter. This enables a more rapid calculation of the estimated thread workload of each port. However, it is noted that the number of pre-assigned threads K need not be a power of two.

Figure 5:
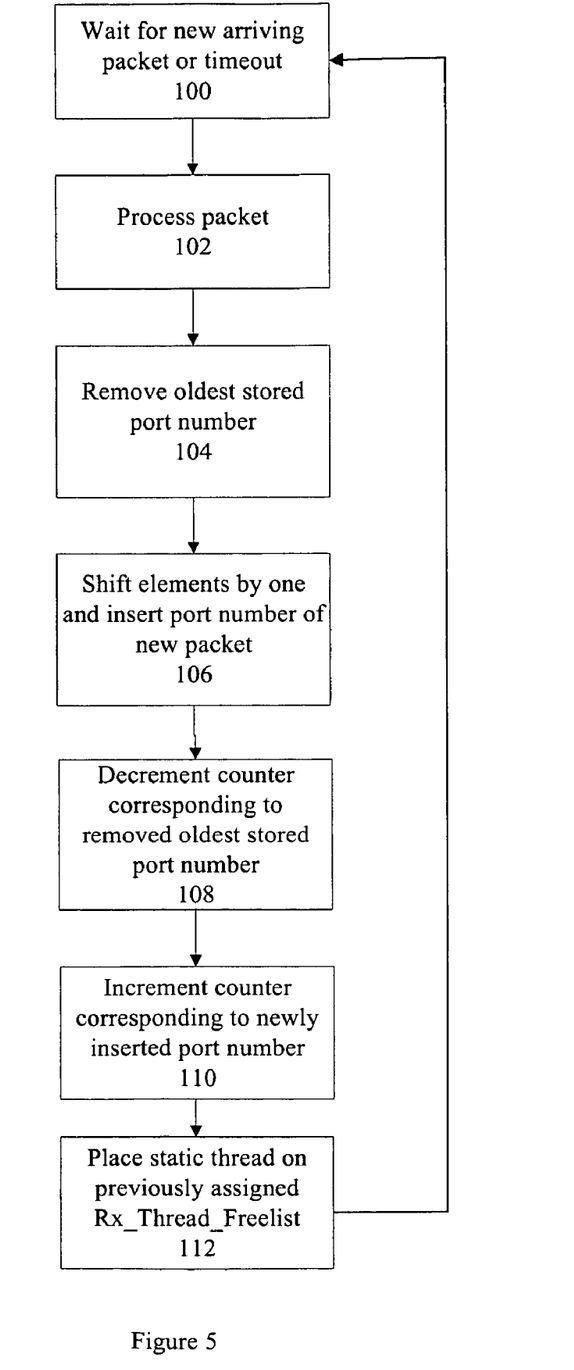
FIG. 5 illustrates the processing of packets by a pre-assigned thread on an Rx_Thread_Freelist.
Figure 6:
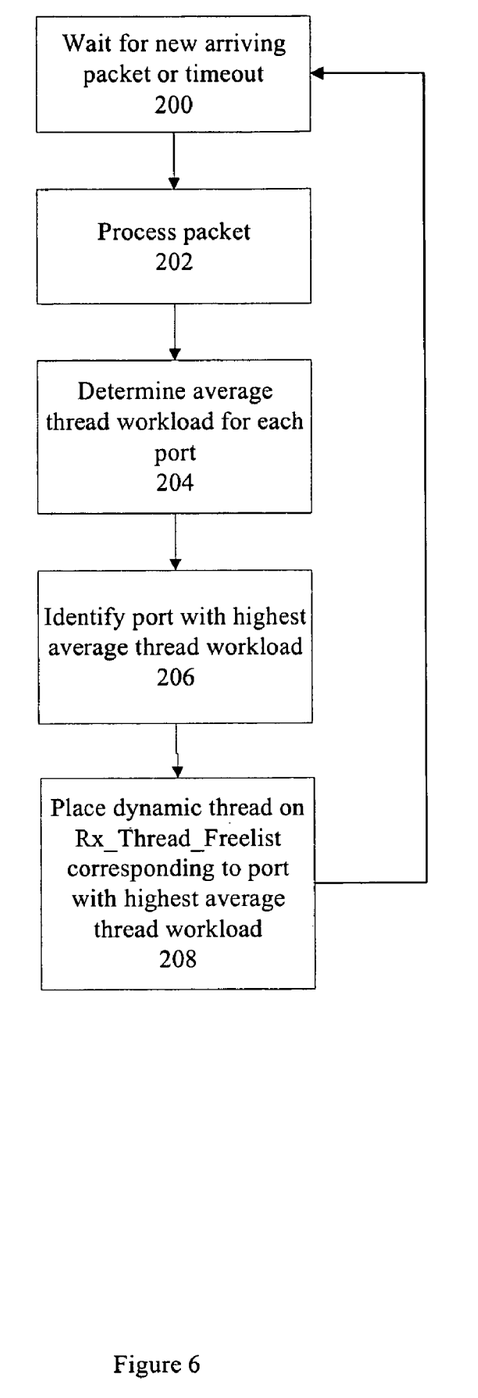
FIG. 6 illustrates the processing of packets by a dynamic thread on an Rx_Thread_Freelist.

FIGS. 5 and 6 illustrate a process for dynamically assigning threads based on the estimated thread workload of each port. As noted, the estimated thread workload of each port is determined using the data structure 52 and counters 56, 58, 60, and 62. FIG. 5 illustrates the processing of packets by a pre-assigned thread on an Rx_Thread_Freelist. At block 100, the pre-assigned thread waits for new arriving data packets or a timeout. At block 102, a new packet arrives and the pre-assigned thread processes the packet. At block 104, the oldest port number stored at the head of data structure 52 is removed from the data structure. At block 106, a shift operation is performed on the data structure to shift the contents by one element toward the head end of the data structure. The port number corresponding to the most recent processed packet is inserted into the tail end of the data structure. At block 108, the counter corresponding to the removed oldest stored port number is decremented by one. At block 110, the counter corresponding to the newly inserted port number is incremented by one. At block 112, the pre-assigned thread is placed on previously assigned Rx_Thread_Freelist and the process is repeated for processing of each newly received packet by a pre-assigned thread.

FIG. 6 illustrates the processing of packets by a dynamic thread on an Rx_Thread_Freelist. Specifically, at block 200, the dynamic thread waits for new arriving data packets or a timeout. At block 202, a new packet arrives and the dynamic thread processes the packet. At block 204, the average thread workload for each port is determined as described above, e.g., by utilizing a shift operation. At block 206, the resulting average thread workloads for each port are compared to identify the port with the highest average thread workload. At block 208, the dynamic thread is placed on the Rx_Thread_Freelist corresponding to the port with the highest average thread workload. The process is then repeated for processing of each newly received packet by a dynamic thread. The additional microcode introduced for assigning a static thread is minimized. In one implementation, one shift and two add/subtract additional operations are needed. The additional microcode introduced for assigning a dynamic thread is also minimized. In one implementation, four shift and three comparing operations are needed.

Figure 7:
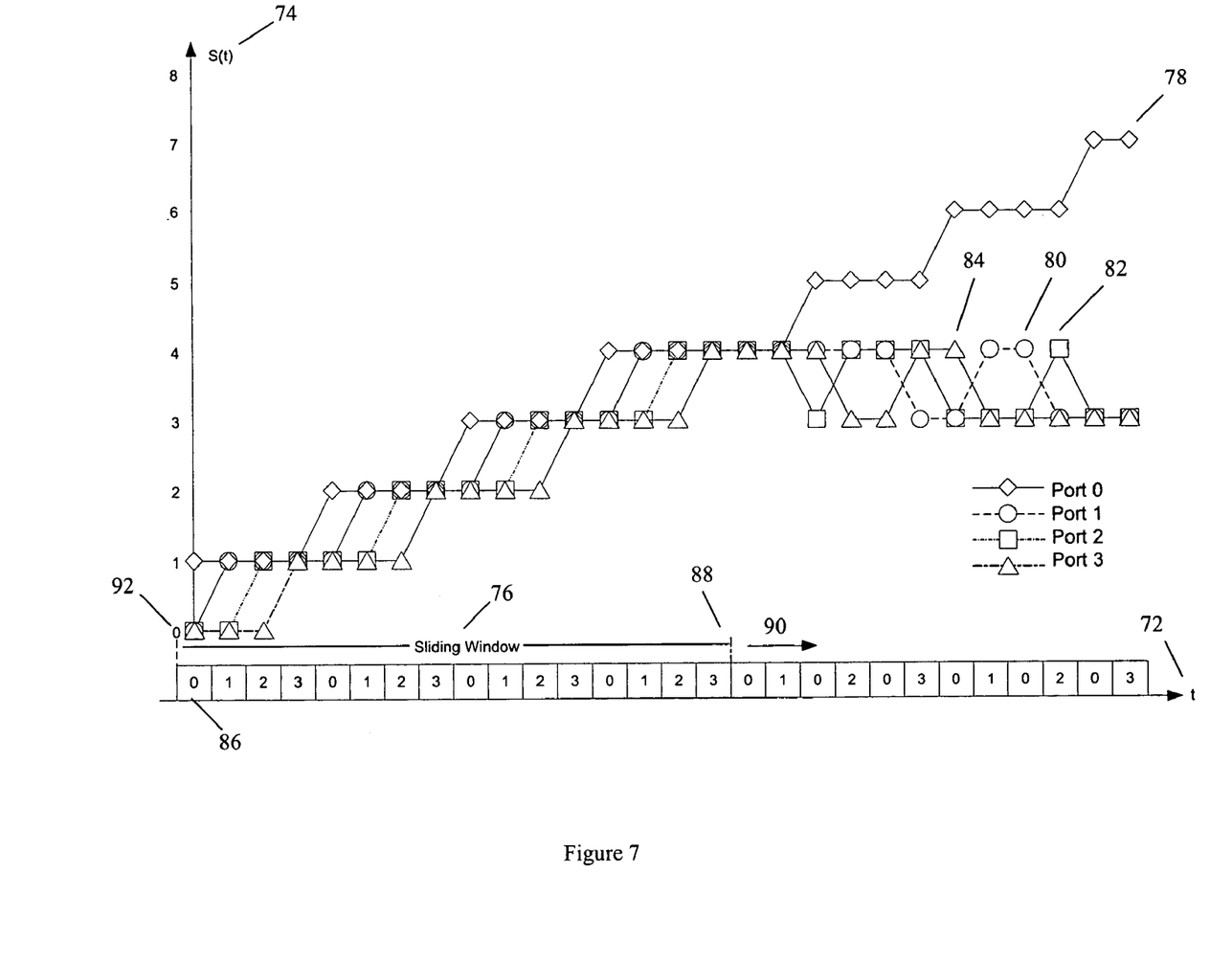
FIG. 7 illustrates operation of a sliding window.

Referring to FIG. 7, operation of a sliding window is illustrated. An axis 72 sets forth port numbers corresponding to packets processed as time t increases. Sliding window 76 is a predetermined number of elements containing port numbers of packets processed. As shown sliding window 76 has a size of 16, i.e., the size of the data structure. Axis 74 represents the number of packets s(t) as a function of time received over a given port in sliding window 76. Each of plots 78, 80, 82, and 84 tracks the value s(t) for port 0, port 1, port 2, or port 3, respectively.

In operation, prior to time 0 92, no packets have been processed and s(t) for each of ports 0, 1, 2, port 3 is zero. At time 0, a packet received on port 0 86 is processed and plot 78 corresponding to port 0 is incremented to a value of 1 for s(t). This process continues until time 88 at which sliding window 76 is completed or filled. When a new packet arrives after the sliding window 76 is completed at time 88, the sliding window 76 shifts one element to the right in a direction indicated by arrow 90 so that the new arriving packet port number is contained in the sliding window 76. The oldest element in the sliding window is no longer within the sliding window 76 following the shift. The plot for the port number of the removed element, i.e., port 0, is decremented by one and the plot for the port number corresponding to the newest packet, i.e., port 0, in the sliding window is incremented by one. At any given time t, the number of packets received on each port for all of the elements within the sliding window can be determined by obtaining the values s(t) from plots 78, 80, 82, and 84 at the corresponding time t.

In a test application of the process described herein, a network processor 2 with eight threads available for each microengine is used to receive and classify packets from four eight-bit UTOPIA SPHY ports. Four of the threads are designated as pre-assigned threads and four of the threads are designated as dynamic threads. One pre-assigned thread is assigned to serve each port. The remaining dynamic threads are assigned to serve ports based on the above-described average thread workload determination. In a test simulation where packets are received on only one port, the performance of the methods described herein produced an approximate 20% performance improvement in packet processing rate relative to a conventional configuration in which two threads are bound to each port. The performance in the test application reached 724 Mbps while the conventional configuration reached only a 602 Mbps rate.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for assigning threads in a processor, comprising:
   assigning one or more static threads to each port of a plurality of ports;
   processing incoming packets with the static threads;
   storing the port numbers of incoming packets processed by the static threads;
   counting the number of packets processed by the static threads for each port;
   calculating an average thread workload for each port;
   determining a highest average thread workload port by comparing the average thread workload for each port; and
   assigning a dynamic thread to the highest average thread workload port to process incoming packets.

2. The method of claim 1, wherein the calculating includes dividing the number of packets processed by the number of static threads assigned to the port.

3. The method of claim 1, wherein assigning the dynamic thread to the highest average thread workload port includes registering the dynamic thread in a receive thread freelist associated with the highest average thread workload port, each receive thread freelist listing available threads to process data packets.

4. The method of claim 1, wherein assigning one or more static threads to each port includes registering one or more static threads in a receive thread freelist associated with each port, each receive thread freelist listing available threads to process data packets.

5. A method for assigning threads in a processor, comprising:
   assigning one or more static threads to each port of a plurality of ports to process incoming packets;
   providing a data structure containing the port numbers of incoming packets processed by static threads;
   providing a plurality of counters, each counter being associated with a port number and counts a frequency of appearance of the port number in the data structure;
   processing a new incoming packet with a static thread;
   updating the data structure by discarding the port number associated with an oldest packet processed and inserting the port number of the new incoming packet;
   updating the plurality of counters by decrementing by one the counter associated with the port number of the oldest packet processed and incrementing by one the counter associated with the port number of the new incoming packet;
   calculating an average thread workload for each port based on the value of each counter;
   determining a highest average thread workload port by comparing the average thread workload for each port; and
   assigning a dynamic thread to the highest average thread workload port.

6. The method of claim 5, wherein the number of static threads assigned to each port is a power of two.

7. The method of claim 5, wherein the calculating includes dividing the value of each counter by the number of static threads assigned to the port associated with the counter.

8. The method of claim 5, wherein assigning the dynamic thread to the highest average thread workload port includes registering the dynamic thread in a receive thread freelist associated with the highest average thread workload port, each receive thread freelist listing available threads to process data packets.

9. The method of claim 5, wherein assigning one or more static threads to each port includes registering one or more static threads in a receive thread freelist associated with each port, each receive thread freelist listing available threads to process data packets.

10. A computer readable storage medium storing instructions that when executed by a computer cause the computer to perform a method for assigning threads in a processor, comprising:
    assigning one or more static threads to each port of a plurality of ports;
    processing incoming packets with the static threads;
    storing the port numbers of incoming packets processed by the static threads;
    counting the number of packets processed by the static threads for each port;
    calculating an average thread workload for each port;
    determining a highest average thread workload port by comparing the average thread workload for each port; and
    assigning a dynamic thread to the highest average thread workload port to process incoming packets.

11. The computer readable storage medium of claim 10, wherein the calculating includes dividing the number of packets processed by the number of static threads assigned to the port.

12. The computer readable storage medium of claim 10, wherein assigning the dynamic thread to the highest average thread workload port includes registering the dynamic thread in a receive thread freelist associated with the highest average thread workload port, each receive thread freelist listing available threads to process data packets.

13. The computer readable storage medium of claim 10, wherein assigning one or more static threads to each port includes registering one or more static threads in a receive thread freelist associated with each port, each receive thread freelist listing available threads to process data packets.

14. A computer readable storage medium storing instructions that when executed by a computer cause the computer to perform a method for assigning threads in a processor, comprising:

assigning one or more static threads to each port of a plurality of ports to process incoming packets;
   providing a data structure containing the port numbers of incoming packets processed by static threads;
   providing a plurality of counters, each counter being associated with a port number and counts a frequency of appearance of the port number in the data structure;
   processing a new incoming packet with a static thread;
   updating the data structure by discarding the port number associated with an oldest packet processed and inserting the port number of the new incoming packet;
   updating the plurality of counters by decrementing by one the counter associated with the port number of the oldest packet processed and incrementing by one the counter associated with the port number of the new incoming packet;
   calculating an average thread workload for each port based on the value of each counter;
   determining a highest average thread workload port by comparing the average thread workload for each port; and
   assigning a dynamic thread to the highest average thread workload port.

15. The computer readable storage medium of claim 14, wherein the number of static threads assigned to each port is a power of two.

16. The computer readable storage medium of claim 14, wherein the calculating includes dividing the value of each counter by the number of static threads assigned to the port associated with the counter.

17. The computer readable storage medium of claim 14, wherein assigning the dynamic thread to the highest average thread workload port includes registering the dynamic thread in a receive thread freelist associated with the highest average thread workload port, each receive thread freelist listing available threads to process data packets.

18. The computer readable storage medium of claim 14, wherein assigning one or more static threads to each port includes registering one or more static threads in a receive thread freelist associated with each port, each receive thread freelist listing available threads to process data packets.

19. An apparatus for assigning threads in a processor, comprising:

a static thread assigning mechanism for assigning one or more static threads to each port of a plurality of ports;
   a processing mechanism for processing incoming packets with the static threads;
   a storage mechanism for storing the port numbers of incoming packets processed by the static threads;
   a counting mechanism for counting the number of packets processed by the static threads for each port;
   an analysis mechanism for calculating an average thread workload for each port and determining a highest average thread workload port; and
   a dynamic thread assigning mechanism for assigning a dynamic thread to the highest average thread workload port.

20. The apparatus of claim 19, further comprising an interface mechanism for receiving packets from a network.

* * * * *